US007212682B2

(12) United States Patent
Bian et al.

(10) Patent No.: US 7,212,682 B2
(45) Date of Patent: May 1, 2007

(54) METHOD AND SYSTEM FOR ENHANCING MEASUREMENT

(75) Inventors: Long Xiang Bian, Sharon, MA (US); Walter P. Sweeney, Jr., Stoughton, MA (US)

(73) Assignee: SICK Auto Ident, Inc., Canton, MA (US)

( * ) Notice: Subject to any disclaimer, the term of this patent is extended or adjusted under 35 U.S.C. 154(b) by 896 days.

(21) Appl. No.: 10/382,405

(22) Filed: Mar. 6, 2003

(65) Prior Publication Data

US 2004/0175052 A1    Sep. 9, 2004

(51) Int. Cl.
*G06K 9/46* (2006.01)
(52) U.S. Cl. .................. 382/254; 382/140; 382/260; 382/275; 235/462.01; 235/462.08; 235/462.12
(58) Field of Classification Search ................ 382/140, 382/149, 260, 275; 235/462.1, 462.02, 462.08, 235/462.12
See application file for complete search history.

(56) References Cited

U.S. PATENT DOCUMENTS

| | | | |
|---|---|---|---|
| 5,591,952 A | * | 1/1997 | Krichever et al. ..... 235/462.11 |
| 5,637,851 A | * | 6/1997 | Swartz et al. ............ 235/462.2 |
| 5,774,585 A | | 6/1998 | Haring |
| 6,332,574 B1 | | 12/2001 | Shigekusa et al. |
| 6,543,691 B1 | * | 4/2003 | Lemelson et al. .......... 235/456 |
| 6,565,003 B1 | * | 5/2003 | Ma ......................... 235/462.1 |
| 6,612,497 B1 | * | 9/2003 | Iida et al. .............. 235/462.25 |

FOREIGN PATENT DOCUMENTS

| | | |
|---|---|---|
| EP | 0 880 103 A2 | 11/1998 |
| EP | 0 880103 A3 | 10/2002 |

OTHER PUBLICATIONS

Gonzalez, Rafael C. and Wintz, Paul, *Digital Image Processing*, Second Edition, pp. 392-394.

* cited by examiner

*Primary Examiner*—Samir Ahmed
*Assistant Examiner*—Yosef Kassa
(74) *Attorney, Agent, or Firm*—Iandiorio & Teska (57) ABSTRACT

A method and system for enhancing measurement of a bar code or other object includes storing a pixel image containing a bar code; determining bar code orientation relative to the stored pixel image; determining a scan track through the pixel image in a succession of pixel to pixel scan paths; determining the angle of each scan path relative to the bar code orientation; and adjusting the number of virtual pixels added to each scan path as a function of the scan path angle and the bar code orientation for equalizing the lengths, measured in pixels, of the scan paths though they are of different actual lengths due to differences in scan path angles.

42 Claims, 10 Drawing Sheets

METHOD AND SYSTEM FOR ENHANCING MEASUREMENT

FIELD OF THE INVENTION

This invention relates to a method and system for enhancing measurement of a bar code image and more generally to enhancing measurement of any image/object.

BACKGROUND OF THE INVENTION

Bar codes employ a pattern of bar elements and space elements of varying widths to represent data. Some systems for reading barcodes use a CCD imager to take a picture of the barcode and analyze the image data to locate and decode the barcode. Once the location and orientation of a bar code is determined within an image, it is necessary to obtain the gray scale profile across the bar code. This profile is needed to calculate the size of the bar elements and space elements to decode the data represented by the bar code. Proper bar and space element width measurements are crucial to correctly reading bar codes. Typically, a scan line is projected across the bar code from one end to the other. This scan line can be at any orientation from 0°–360° due to the orientation of the bar code itself. In order to calculate the width of the bar and space elements it is necessary to obtain the grayscale values of the pixels that lie on the scan line. As long as the scan line is at a constant angle, the ratio of the different width bar code elements will be constant so the correct data can eventually be extracted. However, if the angle of the scan line changes within the bar code, the apparent widths of the elements will change too: the ratio of the widths will not be constant and errors will result. The angle of the scan line can change because the scan line must change direction in order to avoid mutilated or obscured bar code portions or when a chain code or other pixel to pixel scan path technique is employed to simulate the scan lines at some angle where the scan line is actually made up of a combination of one or more scan paths of different angles. In these instances the apparent width of a bar code element can vary depending upon the angle of the scan path along which it was scanned. In this case, the ratio will not be constant and errors will result. Chain codes are explained in *Digital Image Processing*, Second Edition, Gonzalez, Rafael C. and Wintz, Paul, pp. 392–394.

BRIEF SUMMARY OF THE INVENTION

It is therefore an object of this invention to provide an improved method and system for enhancing the measurement of a bar code or other object within an image.

It is a further object of this invention to provide such an improved method and system which enables a more accurate and faster measurement of a bar code or other object within an image.

It is a further object of this invention to provide such an improved method and system which enables a more accurate representation of a bar code gray scale profile and provides it faster.

The invention results from the realization that a more accurate and faster system and method for measuring a barcode or other object within an image when the scan changes direction along different scan paths can be effected by adjusting the measuring standard used in the scan paths so that the measured scan paths are equalized even though the actual scan paths may be of different lengths.

This invention features a method of enhancing measurement of a bar code including storing a pixel image containing a bar code and determining the bar code orientation relative to the stored pixel image. A scan track is selected through the pixel image in a succession of pixel to pixel scan paths and the angle of each scan path relative to the bar code orientation is determined. The number of virtual pixels added to each scan path is then adjusted as a function of the scan path angle and the bar code orientation for equalizing the lengths, measured in pixels, of the scan paths though they are of different actual lengths due to differences in scan path angles.

In the preferred embodiment, the determining of a scan track may include selecting a chain code. Determining the angle of the scan path may include defining the chain code pattern.

The invention also features a system for enhancing measurement of a bar code including means for storing a pixel image containing a bar code and means for determining the bar code orientation relative to the stored pixel image. There are means for determining a scan track through the pixel image in a succession of pixel to pixel scan paths and means for determining the angle of each scan path relative to the bar code orientation. There are means for adjusting the number of virtual pixels added to each scan path as a function of the scan path angle and the bar code orientation for equalizing the lengths, measured in pixels, though they are of different actual lengths due to the differences in scan path angles. The means for determining a scan track may include means for selecting a chain code and the means for determining the angle of each scan path may include means for defining the chain code pattern.

The invention also features a method of enhancing measurement of an object including storing a pixel image containing the object and determining the object orientation relative to the stored pixel image. The scan track through the pixel image is determined in a succession of pixel to pixel scan paths and the angle of each scan path relative to the object orientation is determined. The number of virtual pixels added to each scan path is adjusted as a function of the scan path angle and object orientation for equalizing the lengths, measured in pixels, of the scan paths though they are of different actual lengths due to the differences in scan path angles.

In a preferred embodiment, determining a scan track may include selecting a chain code and determining the angle of each scan path may include defining the chain code pattern.

The invention also features a system for enhancing measurement of an object including means for storing a pixel image containing the object and means for determining the object orientation relative to the stored pixel image. A scan track through the pixel image is determined in a succession of pixel to pixel scan paths and the angle of each scan path is determined relative to the object orientation. The number of virtual pixels added to each scan path is adjusted as a function of the scan path angle on object orientation for equalizing the lengths, measured in pixels, of the scan paths though they are of different actual lengths due to differences in scan path angles.

In a preferred embodiment, the means for determining a scan track may include means for selecting a chain code and the means for determining the angle of each scan path may include means for defining the chain code pattern.

This invention also features a method of enhancing measurement of a bar code including determining a first scan angle between the bar code orientation and the scan direction along a first scan path through the bar code. There is a predetermined measuring standard. The same measuring standard is applied along a second scan path through the bar code at a second scan angle to the bar code. The measuring standard as applied to at least one of the first and second scan paths is adjusted as a function of the scan angles and bar code orientation in order to equalize the measured lengths of the scan paths though they are different actual lengths due to the difference in their scan angles relative to the bar code orientation.

In a preferred embodiment the measuring standard may be in pixel units of a pixel imaging array. The measuring standard may be adjusted by adding virtual pixel units to the measurement in one of the scan paths until the total number of pixel units and virtual pixel units in each scan path are equal. The pixel imaging array may be a square array. The difference between the scan angles may be constant and it may be 45°.

The invention also features a system for enhancing measurement of a bar code including means for determining a first scan angle between the bar code orientation and the scan direction along a first scan path through the bar code. There is a predetermined measuring standard. There are means for applying the same measuring standard along a second scan path through the bar code at a second scan angle to the bar code image. There are means for adjusting the measuring standard as applied to at least one of the first and second scan paths as a function of the difference between the first and second scan angles for equalizing the measured lengths of the scan paths though they are of different actual lengths due to the difference of their scan angles relative to the bar code image.

The invention also features a method of enhancing measurement of an object including determining a first scan angle between the object orientation and the scan direction along a first scan path having a measuring standard through the object. The same measuring standard is applied along a second path through the image of the object at a second scan angle to the object orientation. The method further includes adjusting the measuring standard as applied to at least one of the first and second scan paths as a function of the scan angles and object orientation for equalizing the measured lengths of the scan paths though they are of different actual lengths due to the difference in their scan angles relative to the object orientation.

The invention also features a system for enhancing measurement of an object including means for determining a first scan angle between the object orientation and the scan direction along a first scan path having a measuring standard through the object, means for applying the same measuring standard along a second scan path through the object at a second scan angle to the object orientation, and means for adjusting a measuring standard as applied to at least one of the first and second scan paths as a function of said scan angles and object orientation for equalizing the measured lengths of the scan paths though they are of different actual lengths due to the difference in their scan angles relative to the object orientation.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 1:
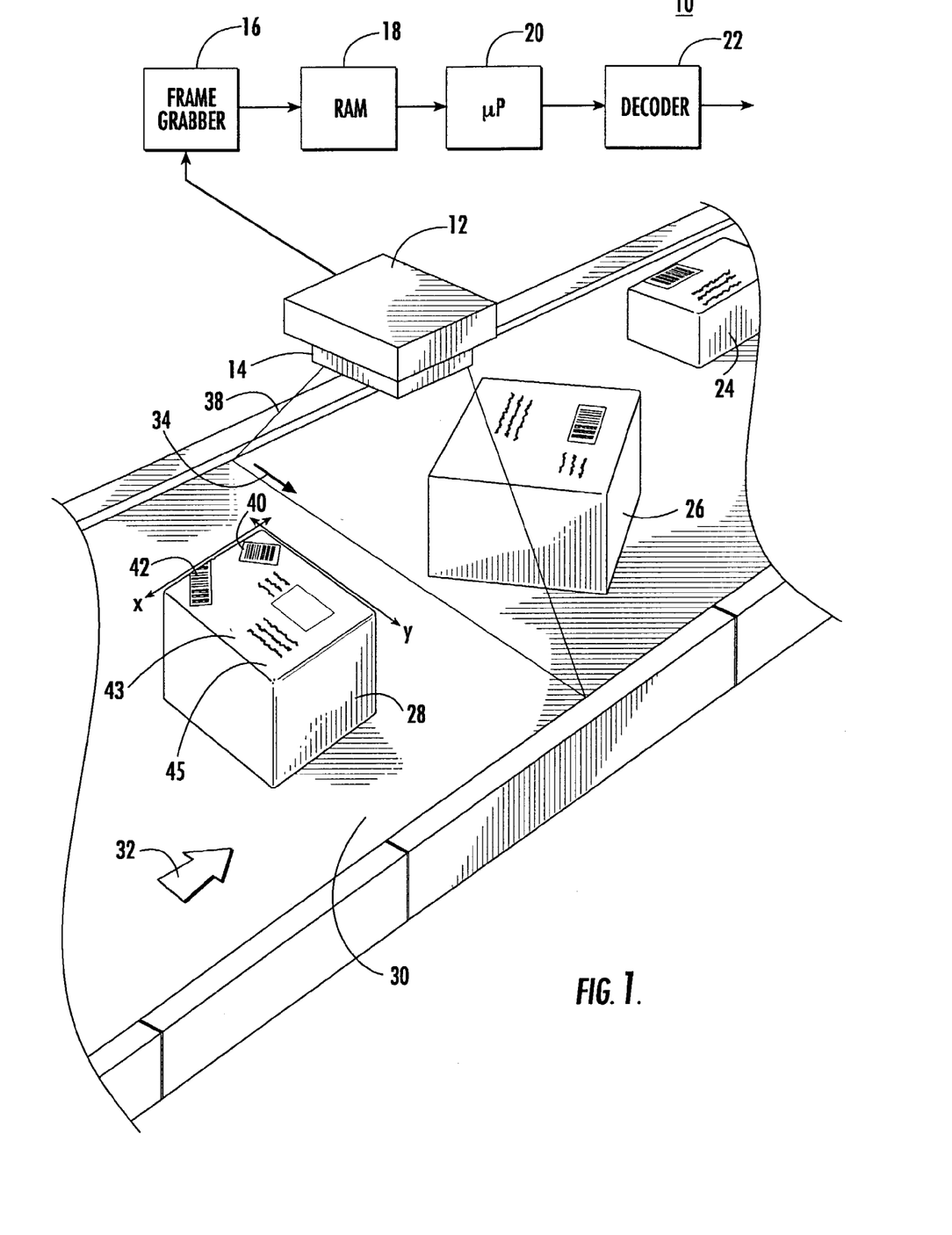
FIG. 1 is a schematic block diagram of a bar code detection system according to this invention.

There is shown in FIG. 1 a bar code detection system 10 including camera 12 with optics 14, frame grabber 16, random access memory (RAM) 18, microprocessor 20, and decoder 22. As packages, such as boxes 24, 26, and 28 are moved along by conveyor 30 in the direction of arrow 32, they encounter a linear field of view 34 of a line of CCD sensors, for example, in camera 12. Each package, as exemplified by box 28, includes on its top 45 one or more bar codes 40, 42 and a variety of extraneous information such as labels, logos, and addresses 43. As box 28 moves along in the direction of arrow 32 with the conveyor through linear field of view 34, a two dimensional image is constructed which is acquired by frame grabber 16 from camera 12. The image is buffered in RAM 18 which is the means for storing the image from which the data is operated on by microprocessor 20 which is programmed to identify and locate the one or more bar codes 40, 42, determine their orientation, measure their elements, and then provide them in proper form to decoder 22 for interpretation of data contained in the bar code bars and spaces.

This invention assumes that the system has identified the location and orientation of the bar code using means provided in the prior art and is concerned rather with obtaining a faster, more accurate measurement of the bar code elements. The method of this invention is preferably carried out by and the system according to this invention is implemented in microprocessor 20 using RAM 18 and configured with the software programs as explained herein.

Figure 2:
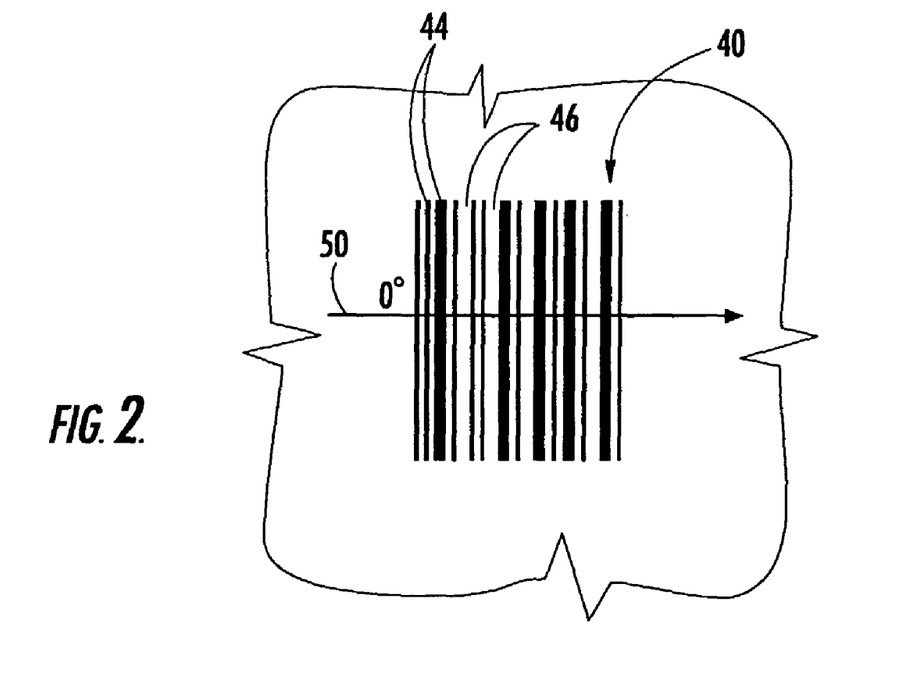
FIG. 2 is an enlarged, more detailed view of the bar code of FIG. 1 showing a scan angle of 0°.

As shown in FIG. 2, bar code 40 includes a plurality of bar code elements namely black bars 44 and white spaces 46. In this particular bar code 40, bars 44 may have two widths, wide or narrow, and, spaces 46 may have two widths, wide or narrow. This is not a necessary limitation of the bar code or of this invention. The bar code may have three different width, four different width, or any other number of different width elements. Further, the contrasting elements need not be black and white. They could be colored such as red and blue. They could be retroreflective and non-retroreflective. They could be magnetic and non-magnetic. In addition, the contrasting segments are not limited to just two. For example, they could be black, white and gray, or black, white and two shades of gray, or red, blue and green, or red, blue, green and yellow. By bar code is meant all types of bar codes including e.g. two dimensional codes and stacked codes as well as the one dimensional types in the example of this disclosure.

One of the problems with reading bar codes is that when the camera is at a fixed height, the bar code may appear at any height within its field of view, depending upon the size of the box to which the bar code label is attached. Thus, if the box is a low one, the bar code label is farther away, the bars and spaces will look smaller as opposed to a bar code label which is on a larger box and as a result is closer to the camera. This problem is solved by using the ratio of the widths of the bar code elements rather than absolute measurement, and it works well in most instances. For example, when the bar code information is stored in RAM 18, FIG. 1 and the microprocessor 20 is programmed to scan across the information, FIG. 2, such that the scan 50 is perpendicular to the orientation of bar code 40, the widths of the wide and narrow bar and space elements will remain constant since the angle of scan 50 remains constant.

Figure 3:
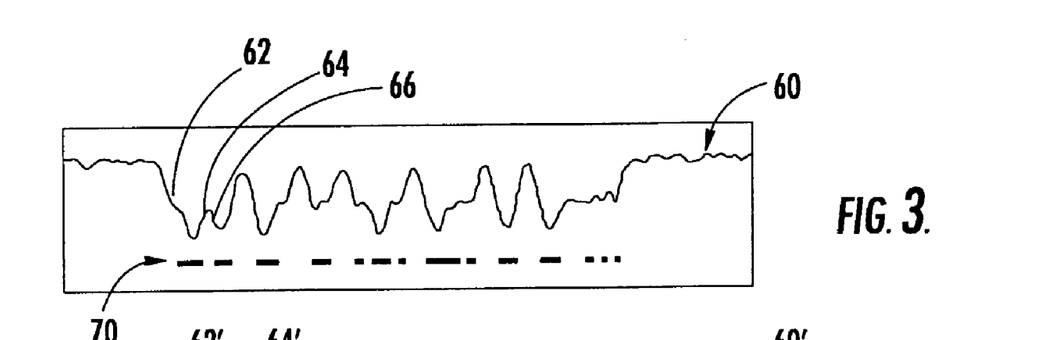
FIG. 3 is a gray scale profile of a bar code image made in accordance with prior art.
Figure 4:
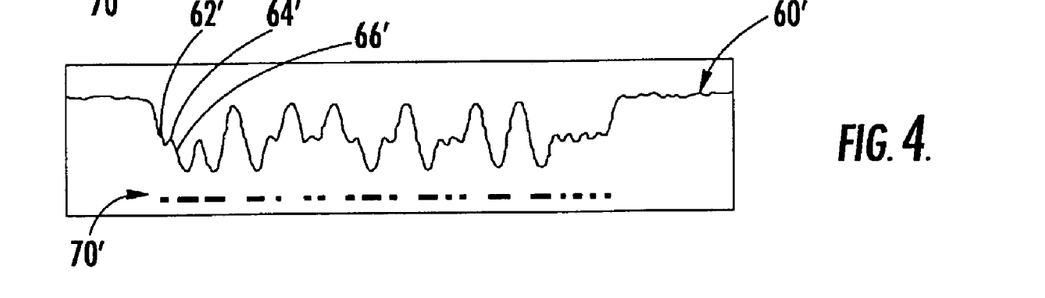
FIG. 4 is a gray scale profile of a bar code image made with the enhanced measurement according to this invention.

In prior art systems, the scan 50 across bar code 40, FIG. 2 would typically produce a gray scale profile similar to gray scale profile 60, FIG. 3, where the transition points 62, 64, 66 indicate transitions from black elements to white elements and result in a specific code representation 70 that represents the data on the bar code. Gray scale profile 60 is typically obtained with the pixel information of the bar code label stored in an array of pixels and using the equation y=mx+b to define the scanning angles 0°–360° to determine what pixels lie on the scan line, where x and y are the coordinates, m is the slope and b is the y intercept. The gray scale profile 60', FIG. 4, obtained in accordance with this invention, is acquired not only much more quickly but more accurately so that transitions 62', 64', 66' produce a different and much more accurate code 70' representing the actual data encoded in the bar code.

Figure 5:
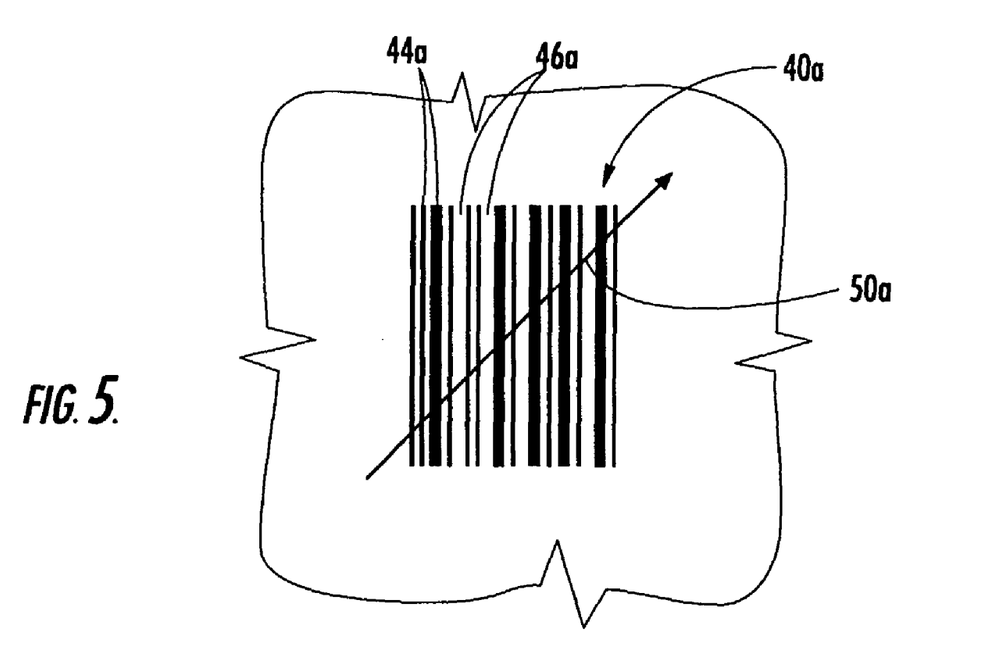
FIG. 5 is a view similar to FIG. 2 with a scan having a constant scan angle of 45° to the bar code.
Figure 6:
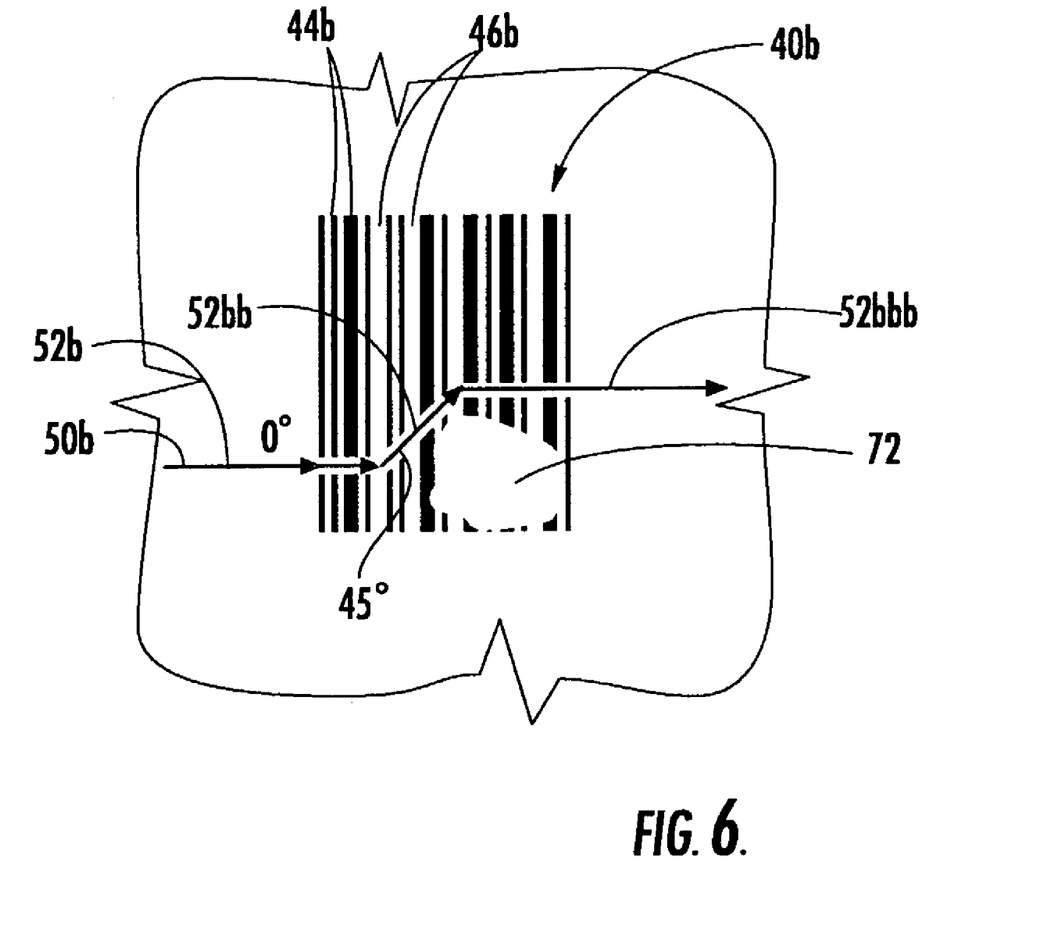
FIG. 6 is a view similar to FIGS. 2 and 5 showing a bar code label in which the scan angle changes during the scan of the bar code, from a first scan path at a first angle to a second scan path at a second angle then back to the first scan path angle.

The prior art approach works fairly well as long as the scan direction remains constant through the entire sweep of the bar code. For example, scan 50a, FIG. 5, is not 0° to the orientation of bar code 40a as was the case in FIG. 2, but it nevertheless will give consistent results since all of the bar code elements, black and white, wide and narrow are encountered at the same angle and so the measured widths of the wide and narrow elements will be the same throughout the sweep. However, this is not always the case. For example, scan 50b, FIG. 6, has a first scan path 52b which approaches bar code 40b at a scan angle of 0° but then changes to a second scan path 52bb at a different scan angle in order to avoid defect 72 before it returns again to a third scan path 52bbb which has the same direction as scan path 52b. Thus, while scan path 52b is crossing each of the bar code elements perpendicularly along the shortest path through them, scan path 52bb is not. Instead, it is moving through the bar code elements at an angle and its path through them will be longer. This causes the bar code elements measured along scan path 52bb to look as if they are larger in their relative sizes than those measured along scan path 52b. This same problem occurs when a chain code approach is used to simulate a scan line.

Figure 7:
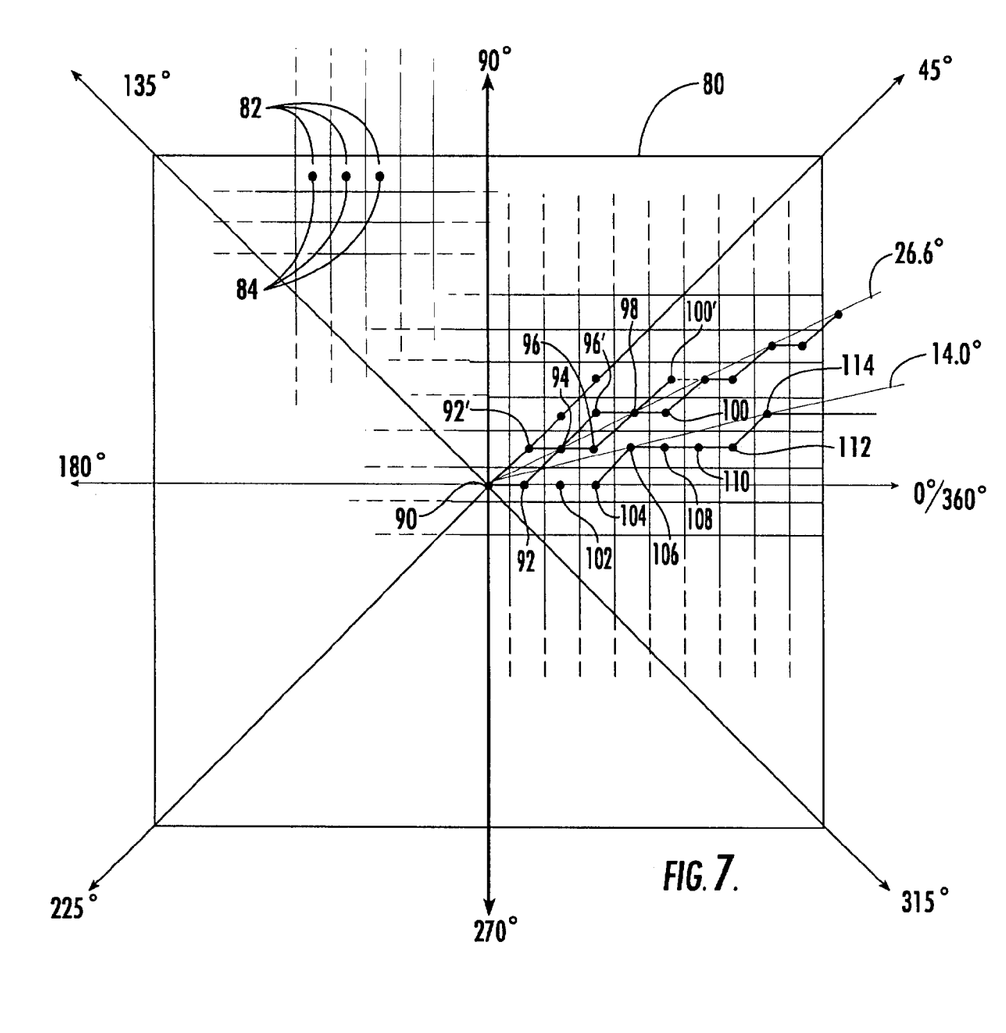
FIG. 7 is a schematic diagram explaining a conventional chain code operation.

Chain codes are employed when, for example, an image is contained on a square pixel array 80, FIG. 7 containing numerous pixels 82. For ease of understanding each pixel 82 is identified as located at its center point 84. It is then apparent that starting from origin 90 one can conveniently scan across the pixels in one pixel increments at 0° and 90° and 180° and 270°. Because of the square nature of the matrix one can also scan in one pixel increments diagonally across the pixels at 45°, 135°, 225°, and 315°. However, for any angle but the primary ones 0°, 45°, 90°, 135°, 180°, 225°, 270° and 315° an approximation must be made by tacking through the pixels. Using a chain code to approximate a scan angle of 26.6° one would begin from origin pixel 90 and move straight to pixel 92 then move diagonally up one pixel at a 45° angle to pixel 94 then straight along to pixel 96 then diagonally up at 45° to pixel 98, then across again to pixel 100, and so on so that the effective direction ends up to be 26.6°. The same result can be had by going from origin pixel 90 at 45° to pixel 92', then to pixel 94 then to pixel 96', then to pixel 98 then to pixel 100' and so on to once again wind up with an effective scan angle of 26.6°. For a lesser angle the scan would proceed from pixel 92 through pixel 102 to pixel 104 and then move at a 45° angle to pixel 106 then three more pixels 108, 110, 112 before moving at 45° again to pixel 114. This would give an effective angle of 14.0°. The bar code orientation determines what pattern of scan paths should be used and that in turn defines the angles of the scan paths (e.g. 0° and 45°).

Thus, whether changing the scan direction to avoid an obliterated or mutilated portion of the field of view or scanning between one of the primary 45° angles in the chain code approach, the scan will have two or more pixel to pixel scan paths at different scan angles causing errors in measuring the widths of the bar code elements. For further explanation of chain code operation see *Digital Image Processing*, Second Edition, Gonzalez, Rafael C. and Wintz, Paul, pp. 392–394.

This invention addresses that problem with a novel and unique approach of using a "rubber ruler", that is a ruler or measuring standard which can expand or contract as needed to ensure that the measured distance such as the width of a bar code element is equal regardless of along which scan path or at which scan path angle it is measured. Revisiting a square pixel matrix 120, FIG. 8A including a number of pixels 122 containing a bar code segment such as black segment 124 with scan 50c approaching at an angle of 0°, the width of bar code element 124 can be seen to be one pixel wide, from pixel 122' to pixel 122". Pixels 122' and 122" are shown as black at 122'a and 122"a, FIG. 8B. Pixels 122''' and 122'''' are shown as white at 122a''' and 122a'''' FIG. 8B.

Figure 8A:
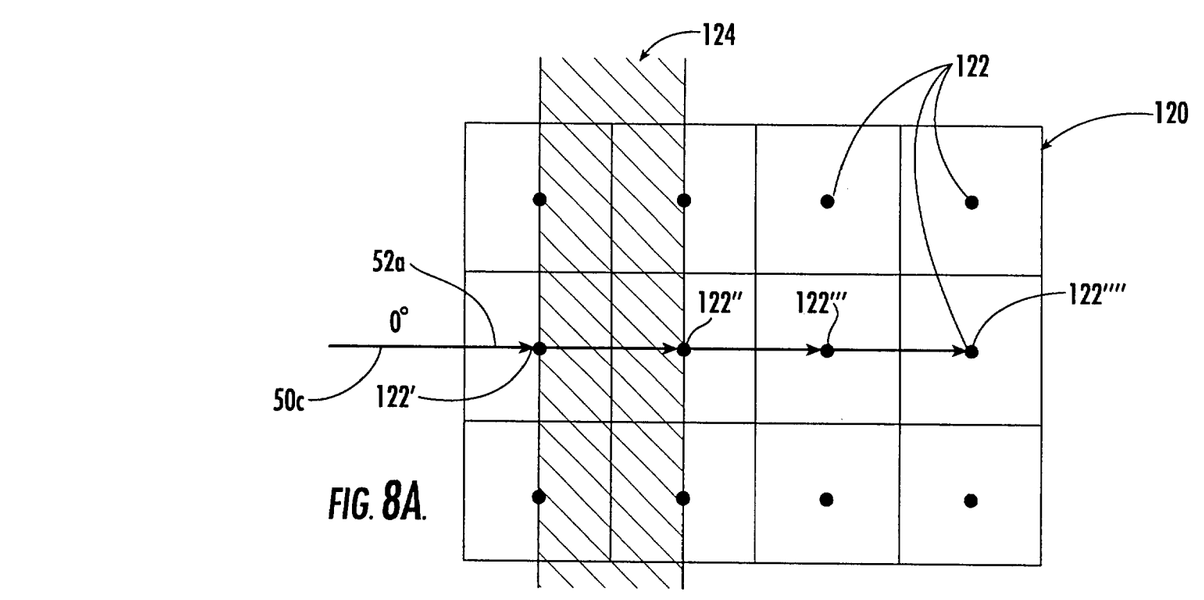
FIG. 8A shows a bar code element on a square pixel matrix being scanned with a scan at 0° to the bar code orientation.
Figure 8B:
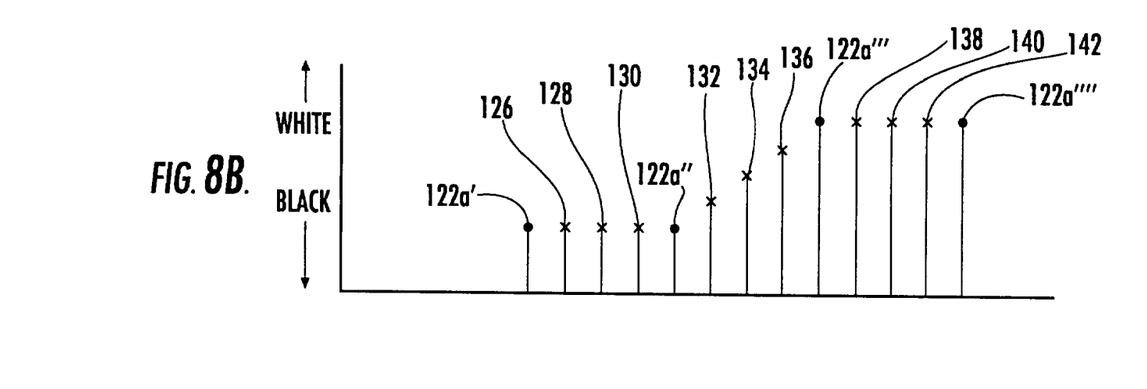
FIG. 8B illustrates the black and white level of the actual and virtual pixels applied in FIG. 8A.

For purposes of improving resolution and allowing the system to operate in whole number or integers instead of fractions, there can be added a number of virtual pixels, for example three virtual pixels, 126, 128, and 130. Virtual pixels 132, 134, and 136 may also be added between pixels 122" and pixel 122''' and between pixel 122''' and pixel 122'''' as shown by virtual pixels 138, 140, 142. Note that when measuring along scan 50c, there is but one scan path 52c and so the measurement of the bars and spaces from pixel to pixel will be constant. The virtual pixels are added interpolatively e.g. pixels 132, 134, 136 are added at increasing degrees of whiteness as they move from pixel 122" to pixel 122'''.

Figure 9A:
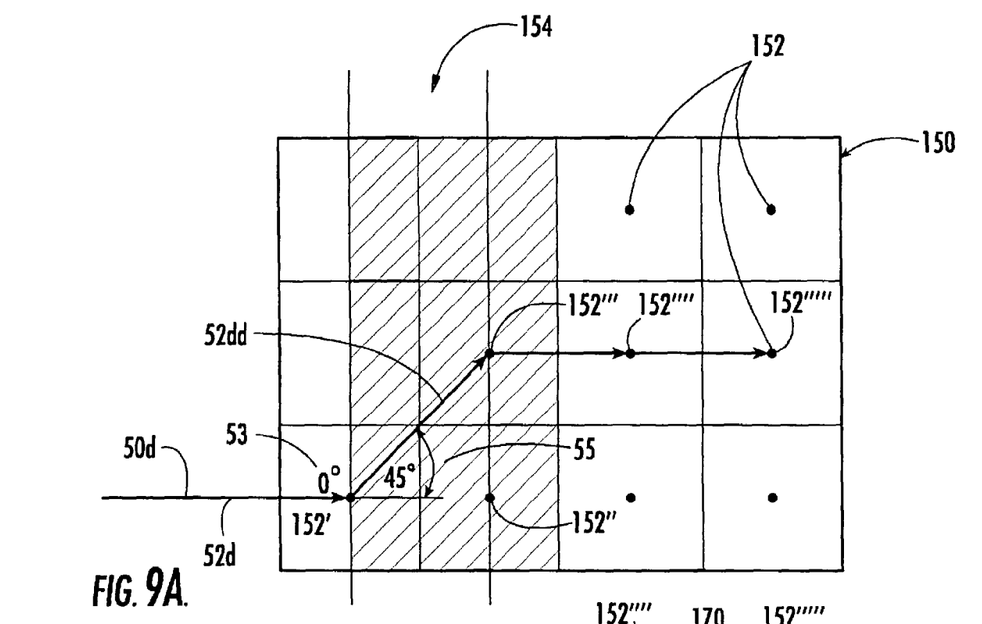
FIG. 9A is a view similar to FIG. 8A with the scan having two scan paths at different angles to the bar code orientation.
Figure 9B:
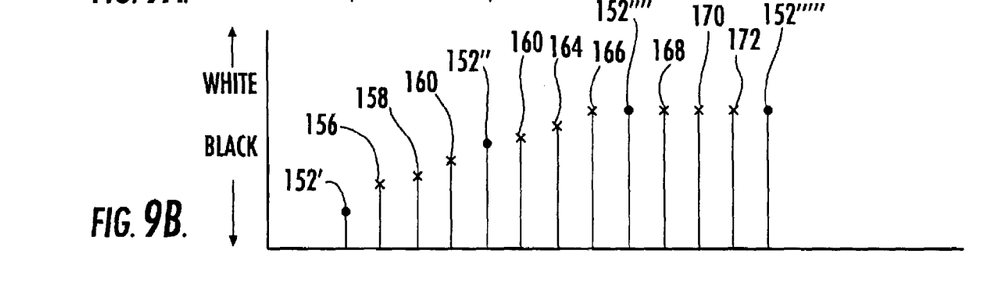
FIG. 9B is a view similar to FIG. 8B of the black and white levels of the actual and virtual pixel employed in FIG. 9A

Assume again a square pixel matrix 150, FIGS. 9A and 9B including pixels 152 where scan 50d again approaches the bar code orientation at 0° and encounters a black bar code element 154. Now however, first scan path 52d at a first scan angle 53 of 0° changes to second scan path 52dd at a second scan angle 55 of 45° in the execution of a chain code operation. Second scan path 52dd is at 45° to the first scan path 52d as is consistent with chain code operation. Because second scan path 52dd occurs at 45° in a square pixel matrix, the distance measured in pixels from pixel 152' across the shortest path to pixel 152'' is the same as the distance along 45° scan path 52dd between pixels 152' and 152''' so that even though the path length is different, along scan path 52dd between pixels 152' and 152''', than it would be between pixel 152' and 152'' the measurement appears the same, that is one pixel in width. Again virtual pixels 156, 158, and 160 may be added to increase the resolution and the ease of digital processing. The addition of these virtual pixels amongst the actual pixels assists in implementing one embodiment of this invention as will be shown hereinafter. The path beyond 152''' to 152'''' and 152''''' will measure consistently and virtual pixels 162, 164, 166, 170 and 172 may be added to increase the resolution and the ease of digital processing.

The problem arises when the orientation of the bar code is not at 0°. It is then that the "rubber ruler" of this invention is applied. For example, square pixel matrix 180, FIGS. 10A and 10B, includes a plurality of pixels 182 bearing a portion of a bar code, bar code element 184, which now makes a −45° angle with respect to the scan 50e. In this situation should scan 50e continue straight along first scan path 52ee, the distance counted would be from pixel $182^I$ to pixel $182^{II}$ to pixel $182^{III}$ or two full pixels. However, if the system is employing a chain code, second scan path 52e will be traversed and its length will be measured by only one pixel, that is from pixel $182^I$ to pixel $182^{IV}$. Thus, while there is but one bar code black element 184, of one width, if it is encountered during a straight portion of the chain code along scan path 52e it will be measured in accordance with the pixel measurement standard as two pixels wide, whereas if it is measured according to the same measurement standard along second scan path 52ee at 45°, it will appear to be only one pixel wide.

Figure 10A:
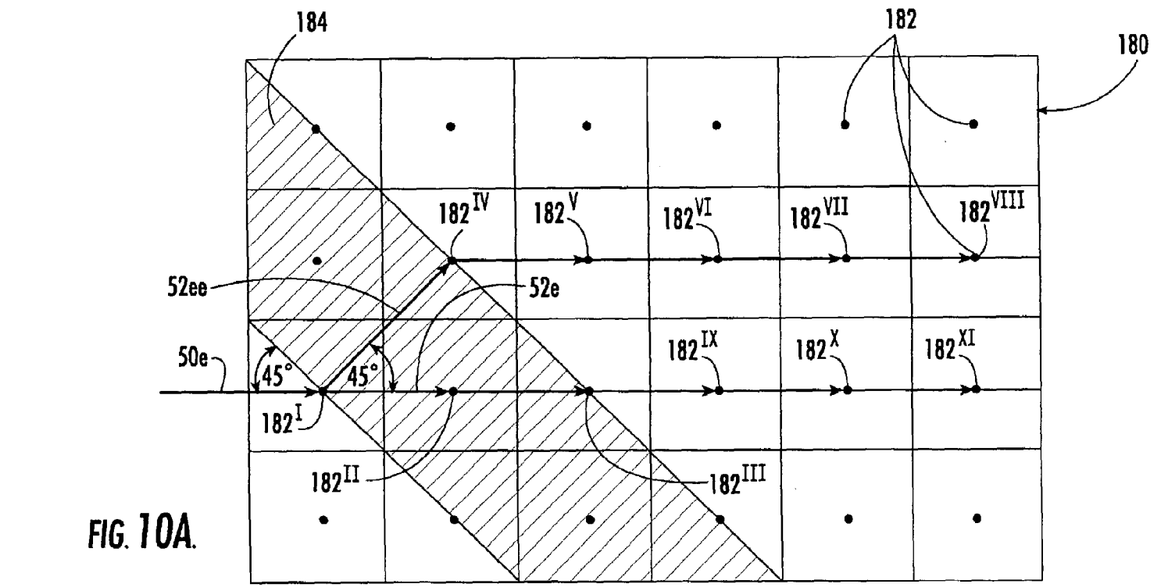
FIG. 10A is a view similar to FIGS. 8A and 9A but with the angle between the scan and the bar code at other than 0°.

Remember, now, that there is an addition of virtual pixels in order to ease the processor burden and to help resolution some. Thus, measuring bar code element 184 along scan path 52e from pixel $182^I$ to pixel $182^{II}$ to pixel $182^{III}$ would be a count or a measure of eight pixels because of the addition of the virtual pixels 186, 188, 190, 192, 194, and 196. While the distance measured in pixels along scan path 52ee between actual pixels $182^I$ and $182^{IV}$ would be simply four pixels by virtue of the addition of the three virtual pixels added in accordance with the practice. To summarize, along scan path 52e, bar code element 184 appears to be two actual pixels or eight pixels of virtual and actual pixels combined in length, whereas along scan path 52ee the width of bar code element 184 appears to be one actual pixel width or a total of four virtual and actual pixels combined: scan path 52e appears to be twice as long as scan path 52ee even though they are measuring the width of the same bar code element 184.

Figure 10B:
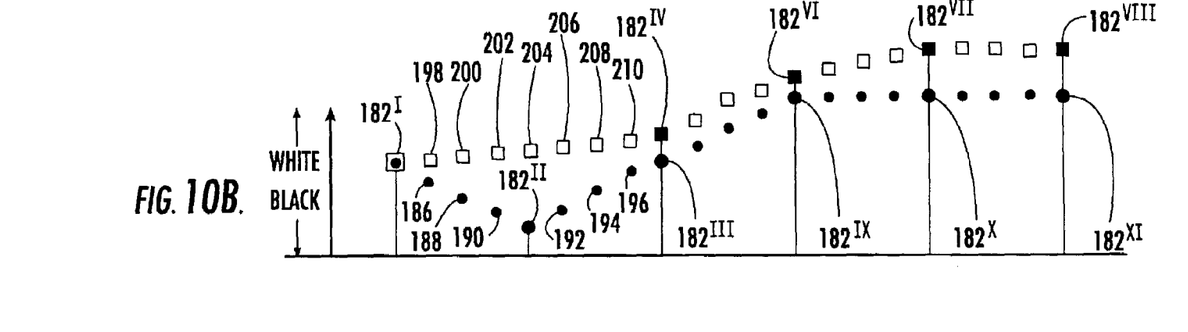
FIG. 10B is a view similar to FIGS. 8B and 9B showing the black and white intensity levels of the actual and virtual pixels introduced to equalize the measured distances in FIG. 10A and realize the "rubber ruler" equalization effect according to this invention.

To solve this problem this invention teaches applying a "rubber ruler", that is, seven virtual pixels are added between pixels $182^I$ and $182^{IV}$ so that the distance measured in pixels including both virtual and actual pixels along the scan path 52ee is eight pixels, the same as along scan path 52e. When scan path 52ee returns to a path through pixels $182^{IV}$–$182^{VIII}$ in a direction parallel to the extension of scan path 52e, i.e. pixels $182^{III}$, $182^{IX}$, $182^X$, and $182^{XI}$, the measurement along each scan path 52e and 52ee will be the same in the number of actual pixels and the number of total actual and virtual pixels as indicated in FIG. 10B. When working with a bar code in a square pixel matrix using a chain code, the scan paths are either of the eight primary directions previously mentioned. The pattern of tacking or flipping back and forth between one direction and another is a function of the scan angle that is sought to be executed as explained previously with respect to FIG. 7. For this particular embodiment, using a chain code and the square pixel matrix, the number of virtual pixels which will be added to equalize the different scan angles of 0° and 45° of the chain code so that they measure the same, is determined by the bar code orientation in accordance with Table 1 below:

TABLE 1

| BAR CODE ORIENTATION | NUMBER OF VIRTUAL PIXELS ADDED | |
|---|---|---|
| (Scan Angle) | 45° | 0° |
| 0°–9° | 3 | 3 |
| 10°–18° | 4 | 3 |
| 19°–27° | 5 | 3 |
| 28°–36° | 6 | 3 |
| 37°–45° | 7 | 3 |

The insertions for 90°, 180°, and 270° are the same as those shown in the 0° column; the insertions for 135°, 225°, and 315° are the same as those shown in the 45° column. See FIG. 7. This assumes a chain code environment where the primary axes are at 45° from 0°–360°. But this is not a necessary limitation of the invention. Other axes could be chosen giving rise to other sets of insertions.

While in this embodiment the "rubber ruler" is applied by adding virtual pixels to second scan path 52ee to bring its apparent measurement equal to that of scan path 52e, this is not a necessary limitation of the invention. For example, the system could subtract pixels from scan path 52e or subtract a few from scan path 52e and add a few to 52ee to accomplish the same result, that is, equalizing the apparent measured paths even though the actual paths are different. If the practice of adding virtual pixels is not done, then the "rubber ruler" will have to be effected dealing with actual pixels. For example in FIG. 10A a pixel could be subtracted from path 52e so that it appears as one pixel width which is equal to the one pixel width along path 52ee. Separately, although the reference so far in Table 1 shows the number of virtual pixels that need to be added as a function of the angle of the scan 50e, with respect to the bar code orientation this is not a limitation of the invention. This has been a matter of convenience and explanation because the platform here is a square pixel matrix and a chain code operation which only varies the two scan paths by a fixed amount of 45°. In less convenient circumstances the essential determination is the angle of the bar code elements. It is this angle that determines the lengths of the scan paths and it is this angle which therefore will determine the number of virtual pixels or actual pixels added or subtracted to equalize the measurement of the two paths, though they actually are different lengths.

Figure 11:
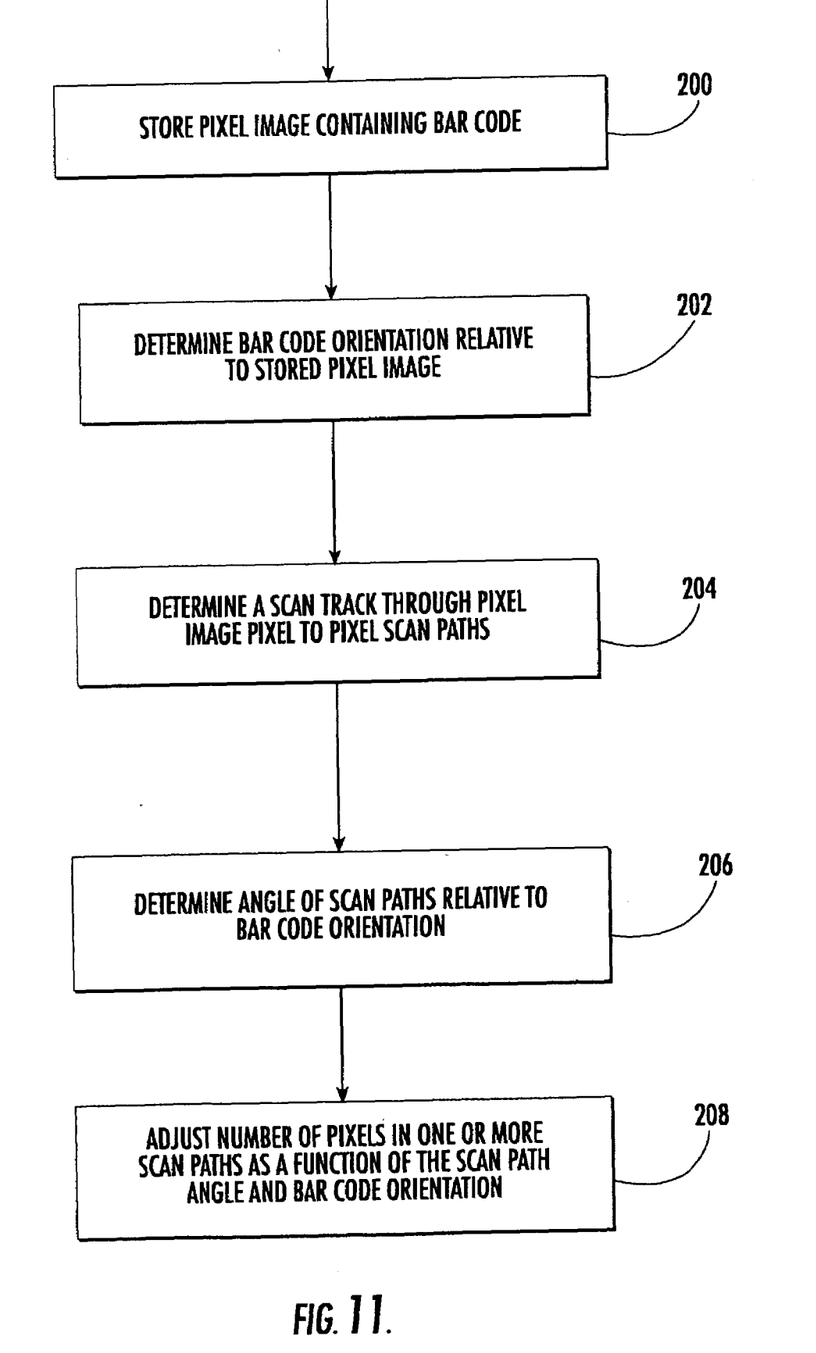
FIG. 11 is a flow chart showing the method according to this invention.

The method of this invention is accomplished by microprocessor 20, FIG. 1, programmed to carry out the several routines as set forth, infra, with respect to FIG. 11 where after being acquired by camera 12, the image containing the bar code or other object is buffered in frame grabber 16, then stored in some means such as RAM 18.

The pixel image containing the bar code or other object is stored in step 200, FIG. 11, and the orientation of the bar code or other object 202 is determined relative to the stored pixel image. The means for determining the orientation is microprocessor 20, programmed to determine location and orientation of a bar code as defined is well known in the art. A scan track is defined 204 through the pixel image in pixel to pixel scan paths. The angle of the scan paths relative to the bar code orientation is determined 206 and then the number of pixels in one or more scan paths is adjusted as a function of the scan path angles and bar code orientation 208.

Figure 12:
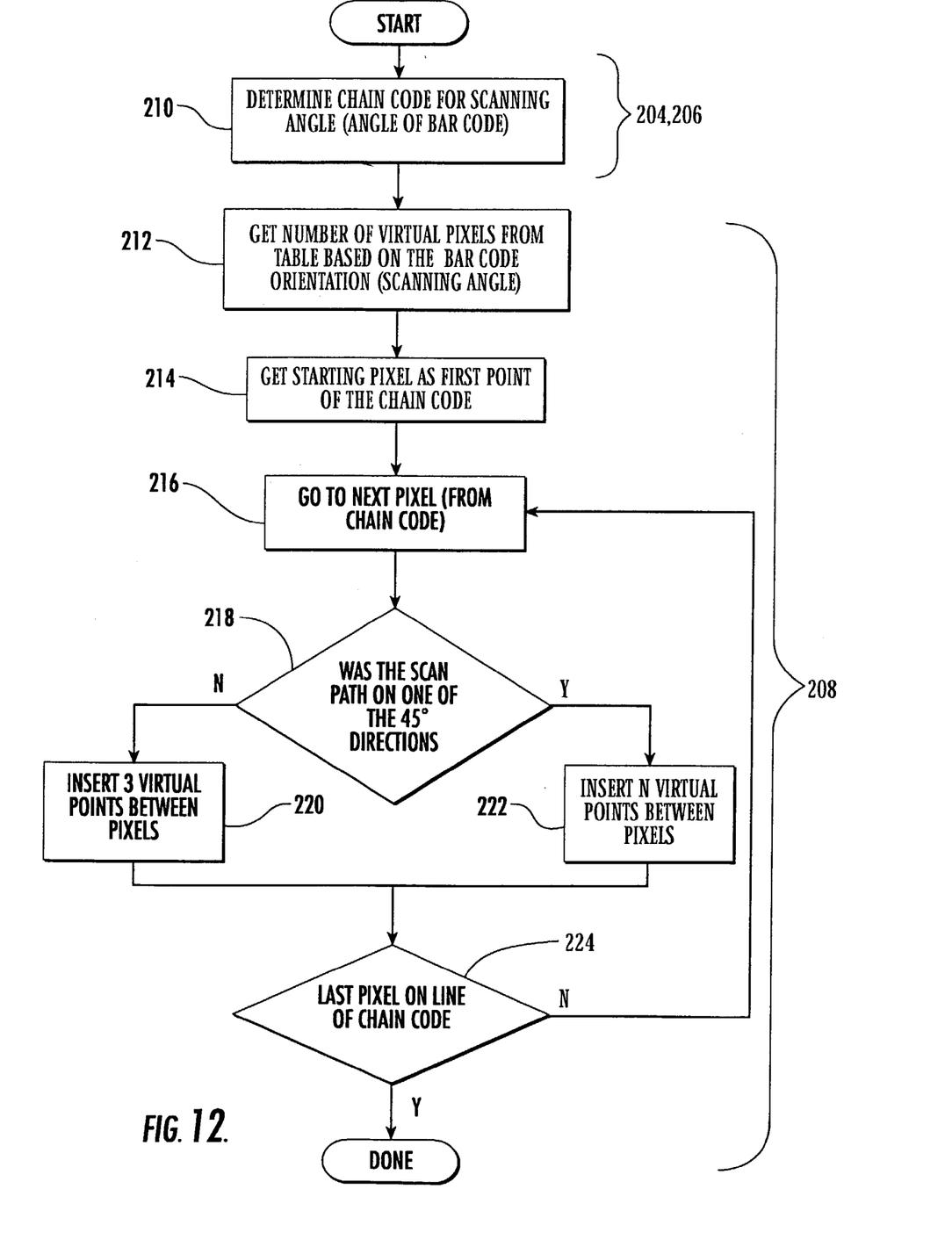
FIG. 12 is a flow chart showing in more detail the determination of the scan track and scan path angles and the adjustment of the pixels in the flow chart of FIG. 11.

The means for defining the scan track and the scan path angles and the adjustment of the number of pixels is microprocessor 20 programmed appropriately as explained with respect to the flow chart in FIG. 12. By applying a chain code approach to determining a pixel to pixel scan path, step 210, both steps 204 and 206 of FIG. 11 are implemented. The particular chain code path is predetermined by the bar code orientation and once the chain code path is defined the angles of the pixel to pixel scan paths is also set e.g. 0°, 45°.

Once the scan path angles are set, the number of pixels in one or more of the paths can be adjusted to equalize measurement. Assuming that the system normally adds three virtual pixels between every pair of actual pixels as previously explained, the next step 212 is to get the number of virtual pixels from Table 1 based on the bar code orientation or scanning angle. A starting pixel is identified as the first point of the chain code, 214, and then the next pixel is identified, 216. If the scan path was not on one of the 45° directions, 218, then only three virtual pixels are inserted, 220, between the pair of actual pixels defining the scan path. If the scan path was on a 45° direction the "n" virtual pixels are inserted, 222, as set forth in Table 1. From operations 220 and 222, the routine ends, 224, if it is on the last pixel, if not it returns to step 216.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A method of enhancing measurement of a bar code comprising:
   storing a pixel image containing a bar code;
   determining bar code orientation relative to the stored pixel image;
   determining a scan track through the pixel image in a succession of pixel to pixel scan paths;
   determining the angle of each scan path relative to the bar code orientation; and
   adjusting the number of virtual pixels added to each scan path as a function of the scan path angle and the bar code orientation for equalizing the lengths, measured in pixels, of the scan paths though they are of different actual lengths due to differences in scan path angles.

2. The method of enhancing measurement of a bar code of claim 1 in which determining a scan track includes selecting a chain code.

3. The method of enhancing measurement of a bar code of claim 2 in which determining the angle of each scan path includes defining the chain code pattern.

4. A system for enhancing measurement of a bar code comprising:
   means for storing a pixel image containing a bar code;
   means for determining bar code orientation relative to the stored pixel image;
   means for determining a scan track through the pixel image in a succession of pixel to pixel scan paths;
   means for determining the angle of each scan path relative to the bar code orientation; and
   means for adjusting the number of virtual pixels added to each scan path as a function of the scan path angle and the bar code orientation for equalizing the lengths, measured in pixels, of the scan paths though they are of different actual lengths due to differences in scan path angles.

5. The system of enhancing measurement of a bar code of claim 4 in which said means for determining a scan track includes means for selecting a chain code.

6. The system of enhancing measurement of a bar code of claim 5 in which said means for determining the angle of each scan path includes means for defining the chain code pattern.

7. A method of enhancing measurement of an object comprising:
   storing a pixel image containing the object;
   determining object orientation relative to the stored pixel image;
   determining a scan track through the pixel image in a succession of pixel to pixel scan paths;
   determining the angle of each scan path relative to the object orientation; and
   adjusting the number of virtual pixels added to each scan path as a function of the scan path angle and the object orientation for equalizing the lengths, measured in pixels, of the scan paths though they are of different actual lengths due to differences in scan path angles.

8. The method of enhancing measurement of an object of claim 7 in which determining a scan track includes selecting a chain code.

9. The method of enhancing measurement of an object of claim 8 in which determining the angle of each scan path includes defining the chain code pattern.

10. A system for enhancing measurement of an object comprising:
    means for storing a pixel image containing the object;
    means for determining object orientation relative to the stored pixel image;
    means for determining a scan track through the pixel image in a succession of pixel to pixel scan paths;
    means for determining the angle of each scan path relative to the object orientation; and means for adjusting the number of virtual pixels added to each scan path as a function of the scan path angle and the object orientation for equalizing the lengths, measured in pixels, of the scan paths though they are of different actual lengths due to differences in scan path angles.

11. The system of enhancing measurement of an object of claim 10 in which said means for determining a scan track includes means for selecting a chain code.

12. The system of enhancing measurement of an object of claim 11 in which said means for determining the angle of each scan path includes means for defining the chain code pattern.

13. A method of enhancing measurement of a bar code comprising:
   determining a first scan angle between the bar code image orientation and the scan direction along a first scan path having a predetermined measuring standard through the bar code;
   applying the same measuring standard along a second scan path through the bar code at a second scan angle to the bar code orientation; and
   adjusting said measuring standard as applied to at least one of said first and second scan paths as a function of said scan angles and bar code orientation for equalizing the measured lengths of the scan paths though they are of different actual lengths due to the difference in their scan angles relative to the bar code orientation.

14. The method of enhancing measurement of a bar code of claim 13 in which said measuring standard is in pixel units of a pixel imaging array.

15. The method of enhancing measurement of a bar code of claim 14 in which said measuring standard is adjusted by adding virtual pixel units to the measurement in one of said scan paths until the total number of pixel units and virtual pixel units in each scan path are equal.

16. The method of enhancing measurement of a bar code of claim 14 in which said pixel imaging array is a square array.

17. The method of enhancing measurement of a bar code of claim 13 in which the difference between said scan angles is constant.

18. The method of enhancing measurement of a bar code of claim 13 in which the difference between said scan angles is 45°.

19. A system for enhancing measurement of a bar code comprising:
   means for determining a first scan angle between the bar code orientation and the scan direction along a first scan path having a predetermined measuring standard through the bar code;
   means for applying the same measuring standard along a second scan path through the bar code at a second scan angle to the bar code image; and
   means for adjusting said measuring standard as applied to at least one of said first and second scan paths as a function of said scan angles and bar code orientation for equalizing the measured lengths of the scan paths though they are of different actual lengths due to the difference in their scan angles relative to the bar code orientation.

20. The system for enhancing measurement of a bar code of claim 19 in which said measuring standard is in pixel units of a pixel imaging array.

21. The system for enhancing measurement of a bar code of claim 20 in which said measuring standard is adjusted by adding virtual pixel units to the measurement in one of said scan paths until the total number of pixel units and virtual pixel units in each scan path are equal.

22. The system for enhancing measurement of a bar code of claim 20 in which said pixel imaging array is a square array.

23. The system for enhancing measurement of a bar code of claim 19 in which the difference between said scan angles is constant.

24. The system for enhancing measurement of a bar code of claim 19 in which the difference between said scan angles is 45°.

25. A system for enhancing measurement of a bar code comprising:
   a storage device for storing an image containing a bar code; and
   a processor, responsive to the image, configured to:
      determine a first scan angle between the bar code orientation and the scan direction along a first scan path having a predetermined measuring standard through the image;
      apply the same measuring standard along a second scan path through the image at a second scan angle to the bar code orientation; and
      adjust said measuring standard as applied to at least one of said first and second scan paths as a function of the said scan angles for equalizing the measured lengths of the scan paths though they are of different actual lengths due to the difference in their scan angles relative to the bar code image.

26. The method of enhancing measurement of a bar code of claim 25 in which said measuring standard is in pixel units of a pixel imaging array.

27. The method of enhancing measurement of a bar code of claim 26 in which said measuring standard is adjusted by adding virtual pixel units to the measurement in one of said scan paths until the total number of pixel units and virtual pixel units in each scan path are equal.

28. The method of enhancing measurement of a bar code of claim 26 in which said pixel imaging array is a square array.

29. The method of enhancing measurement of a bar code of claim 25 in which the difference between said scan angles is constant.

30. The method of enhancing measurement of a bar code of claim 25 in which the difference between said scan angles is 45°.

31. A method of enhancing measurement of an object comprising:
   determining a first scan angle between the object orientation and the scan direction along a first scan path having a measuring standard through the object;
   applying the same measuring standard along a second scan path through the object at a second scan angle to the object orientation; and
   adjusting said measuring standard as applied to at least one of said first and second scan paths as a function of said scan angles and object orientation for equalizing the measured lengths of the scan paths though they are of different actual lengths due to the difference in their scan angles relative to the object orientation.

32. The method of enhancing measurement of an object of claim 31 in which said measuring standard is in pixel units of a pixel imaging array.

33. The method of enhancing measurement of an object of claim 32 in which said measuring standard is adjusted by adding virtual pixel units to the measurement in one of said scan paths until the total number of pixel units and virtual pixel units in each scan path are equal.

34. The method of enhancing measurement of an object of claim 32 in which said pixel imaging array is a square array.

35. The method of enhancing measurement of an object of claim 31 in which the difference between said scan angles is constant.

36. The method of enhancing measurement of an object of claim 31 in which the difference between said scan angles is 45°.

37. A system for enhancing measurement of an object comprising:
- means for determining a first scan angle between the object orientation and the scan direction along a first scan path having a measuring standard through the object;
- means for applying the same measuring standard along a second scan path through the object at a second scan angle to the object orientation; and
- means for adjusting said measuring standard as applied to at least one of said first and second scan paths as a function of said scan angles and object orientation for equalizing the measured lengths of the scan paths though they are of different actual lengths due to the difference in their scan angles relative to the object orientation.

38. The system for enhancing measurement of an object of claim 37 in which said measuring standard is in pixel units of a pixel imaging array.

39. The system for enhancing measurement of an object of claim 38 in which said measuring standard is adjusted by adding virtual pixel units to the measurement in one of said scan paths until the total number of pixel units and virtual pixel units in each scan path are equal.

40. The system for enhancing measurement of an object of claim 38 in which said pixel imaging array is a square array.

41. The system for enhancing measurement of an object of claim 37 in which the difference between said scan angles is constant.

42. The system for enhancing measurement of an object of claim 37 in which the difference between said scan angles is 45°.

\* \* \* \* \*